March 22, 1966 W. A. STOUT 3,242,453
GEAR ADJUSTED VARIABLE RESISTOR
Original Filed July 3, 1963 2 Sheets-Sheet 1
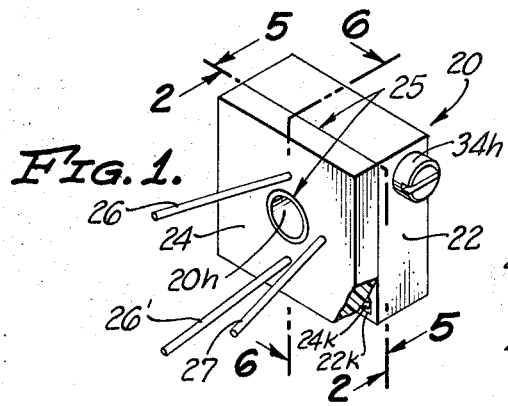
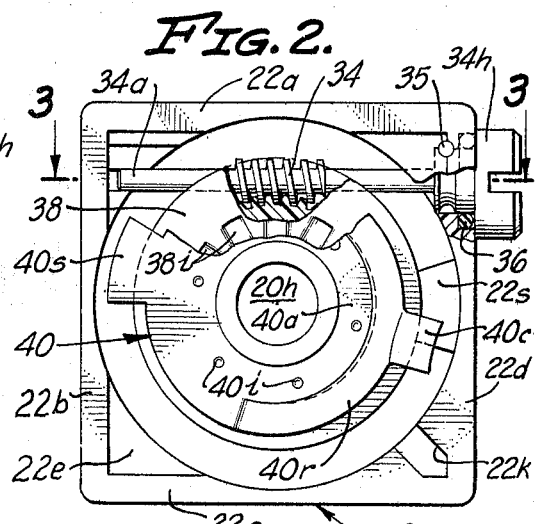
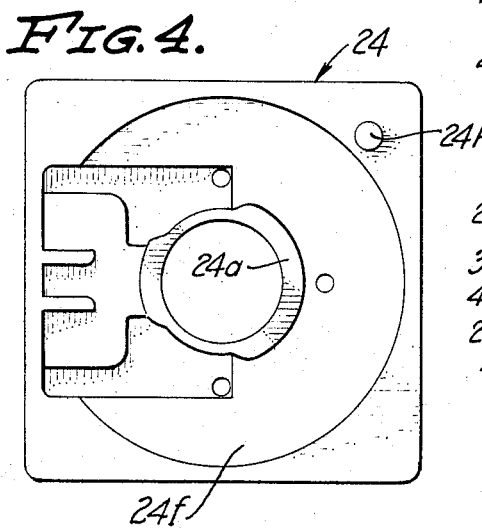
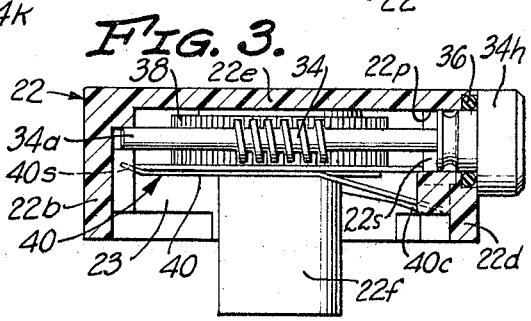
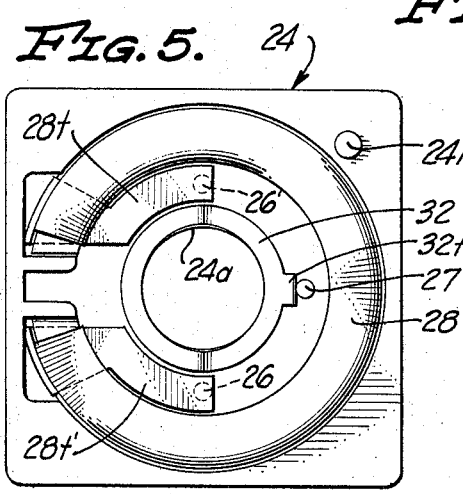
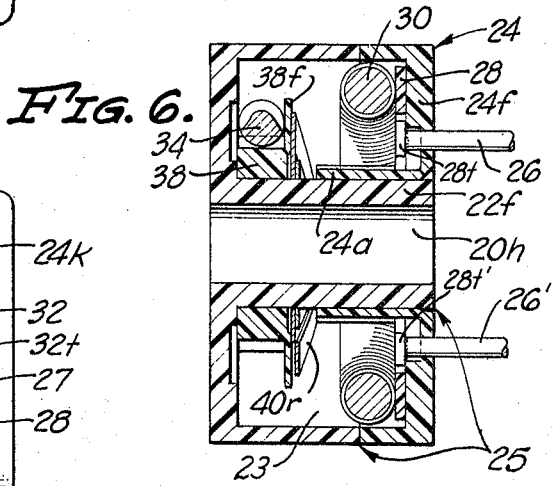
INVENTOR.
WYLIE A. STOUT March 22, 1966 W. A. STOUT 3,242,453
GEAR ADJUSTED VARIABLE RESISTOR
Original Filed July 3, 1963 2 Sheets-Sheet 2

INVENTOR.
WYLIE A. STOUT
BY

United States Patent Office 3,242,453
Patented Mar. 22, 1966

3,242,453
GEAR ADJUSTED VARIABLE RESISTOR
Wylie A. Stout, Riverside, Calif., assignor to Bourns, Inc., a corporation of California
Continuation of application Ser. No. 292,649, July 3, 1963. This application June 15, 1964, Ser. No. 376,591
14 Claims. (Cl. 338—174)

This invention pertains to variable resistors, and more particularly to improvements in potentiometers having operating components in an enclosed chamber of a housing and wherein adjustments are effected by rotation of a driving gear such as a worm gear. Examples of potentiometers of the broad general class to which the invention is directed are illustrated in U.S. Patents Nos. 2,945,198, 2,887,554, and 2,880,293. Such potentiometers comprise an elongate arcuate resistance element disposed around the axis of a rotary contact device that is rotated either directly or through clutch means by a driven gear such as a worm wheel that is in mesh with and thus operated by the adjusting or driving gear. The invention as herein disclosed embodies improvements in an exemplary variable resistor of the type described in the copending application Serial No. 183,855 filed March 30, 1962, and assigned to the assignees of the present invention. This application is a continuation of application Ser. No. 292,-649 filed July 3, 1963, now abandoned.

Potentiometers of the broad class to which the present invention is applicable include cases or housings of generally square plan-form, or of square shape with one corner portion omitted for convenience in using flexible-lead terminals; and in general such are constructed to utilize an outer or rim portion of the housing for accommodation of mounting-devices such as screws or bolts. In some such instruments a set of through-bores or holes is provided for mounting screws, and in other such instruments a set of indentations around the periphery is provided for reception of wires or other fastening elements. As a consequence of those characteristics, the interior space allotted to the resistance element is restricted so that a resistance element of only relatively small radius can be used. Further, only substantially identical instruments (that is, those with matching mounting holes or grooves and of the same over-all dimensions), can be stacked and mounted in face-to-back relationship.

Additionally it may be noted that in known prior-art worm gear adjusted variable resistors or potentiometers certain compromises were necessary to avoid stripping of the teeth of the worm wheel in the event the driving worm gear was overrun, that is, rotated beyond prescribed limits. Thus such a potentiometer might on the one hand have a rotary contact that is permitted to be rotated through an indefinite number of revolutions in either direction, that is, no stop means are provided. In that type of device the potential division drops suddenly from a maximum to a minimum or open circuit zero value (or vice versa) incident to continued driving gear rotation. Such operation, or the possibility of such operation, is in many circuits extremely undesirable and/or intolerable. Hence in other prior-art worm gear adjusted potentiometers certain stop means in the form of movement-restricting means are employed to positively preclude rotation of the rotary contact through a complete revolution or beyond either end of the resistance element. Since the interior mechanism of such potentiometers is not visible to the technician or operator of the device, continued worm gear rotation during an adjusting operation brings into action the stop means, after which further rotation of the driving gear in the same direction must result in damage such as stripping of teeth from the driven gear or worm wheel, unless slip-clutch means are provided. Thus the alternative choice in the compromise has been to provide such clutch means. Provision of such clutch means, ordinarily in the form of plate-like friction clutch means interposed between the driven gear and the rotary contact, presents the possibility of the clutch means slipping while the contact is not at an end of the resistance element and without the stop means being engaged, thus failing to effect desired rotation of the contact and nullifying the adjustment effort.

The exemplary potentiometer herein disclosed, like that disclosed in the noted application Ser. No. 183,855, does not use mounting holes or grooves at or near the outer periphery of the potentiometer, and utilizes for reception of mounting or fastening means, a single hole or aperture that is disposed at the center of the potentiometer and extends therethrough from face to back of the instrument. The single mounting hole thus provided is preferably and conveniently produced along and around the axis of rotation of the rotary contact and driven gear or worm wheel, and thus is not only located in a region of little value within the instrument and so permits use of a much longer resistance element, but the hole is also so located and such that potentiometers or variable resistors of various sizes and capacities can readily and economically be disposed or stacked together and secured in place by the same single mounting screw or rod. In providing the mounting hole, the exemplary potentiometer housing is so formed that requisite strength is provided, and electrical isolation and protection is provided for the operating components from foreign matter and the mounting screw or rod. Further, the herein disclosed exemplary potentiometer provides for positive limitation of rotation of the rotary contact to a prescribed arc of less than one turn (revolution), eliminates the extra parts ordinarily involved in provision of a separate clutch-device, and concurrently avoids possibility of stripping of gear teeth or other damage to operating components if the driving gear is excessively driven. Those advantages characteristic of the potentiometer disclosed in the aforementioned copending application and therein disclosed are retained by the exemplary potentiometer herein depicted and described. In addition, and in accord with the present invention, improved results are secured in potentiometers of the broad class noted and as herein exemplified in a similar potentiometer, by provision of a toothed driven gear such as a worm wheel which includes an insulative outwardly extending flange which extends beyond the region of interengagement between the driven worm wheel and the driving worm gear and thus provides a shield between the conductive driving gear and the rotary contact device that is next-adjacent to and driven by the worm wheel; and further provides substantially positive driving of the contact between ends of the resistance element while permitting slipping during overdrive, and production of a signal indicating the latter condition. As may be understood, the worm gear of worm gear adjusted resistors is ordinarily formed of conductive material such as stainless steel, and similarly the rotary device comprising the element-wiping contact is of conductive material; and due to close adjacency of those components and a consequent likelihood of accidental contact, it is desirable to interpose an insulative shield between the two conductive members and to assure a long nonconductive path between the two at all times. By the present invention such a shield is provided without addition of any parts to the potentiometer and without complicating assembly of the instrument. Conveniently, and as herein illustrated, the entire worm wheel is formed of insulative material and as an integral member, and the worm wheel is formed with an annular radially-extending flange that is arranged to serve as a shield between the worm gear and the contact. The exemplary potentiometer according to the invention and herein depicted and described includes simple inexpensive means which enhances the operation by providing the noted substantially positive drive of the contact normally and acts to produce one or more sense-perceptible signals if and when relative motion between the driven gear and the rotary contact device occurs due to the latter being arrested, as when the rotary electric contact reaches either end of the arcuate resistance element and interacting stop structures arrest the rotary contact device while rotation of the driving worm gear is continued. The term "sense-perceptible" as used herein means capable of being sensed or detected by one of the human senses such as the auditory sense or hearing and the tactile sense or sense of touch. As may be evident, in operating or adjusting very small potentiometers of the type here of concern it is very easy for the operator to continue to rotate the driving worm gear after the contact has been driven to the end of the resistance element, and it is desirable to have means for producing a signal that may be sensed by the operator, indicating such over-driving of the worm gear. The present invention, without addition of any parts and with only inexpensive alterations of known parts, provides means for producing either or both of two types of signals when overdriving occurs, the first type of signal being detectible by the tactile sense or feel or the operator and the other an audible signal concurrently produced and detected by ear, whereby the operator may be instantly apprised of relative rotation between the driven worm wheel and the rotary device carrying the wiper contact. In other respects the exemplary potentiometer according to the invention and herein illustrated may be like or similar to that disclosed in the aforementioned application Ser. No. 183,855, the disclosure of which application is incorporated herein by reference to any extent necessary to a full understanding of the construction and operation of the exemplary variable resistor or potentiometer.

The operating parts of the potentiometer, comprising essentially a resistance element, contact means, terminal connections, and worm wheel and worm gear means, are disposed in a case or housing that is formed preferably as two principal parts each of dielectric material, and that is preferably produced by molding procedures well known in the molding arts. One housing part, herein for convenience called a cover, is provided with a centrally located generally tubular portion or member whose interior bore provides the mounting hole for reception of a rod or screw providing support for the instrument. The tubular structure serves to absorb compressive mounting forces and also serves as a shaft upon which rotatable components including a worm wheel and a rotary electric contact device are mounted for rotation. Preferably the tubular structure also serves as a guide means that greatly simplifies accurate assembly of the housing and the components therein. The interior of the housing provides a generally annular chamber in which operating parts are disposed. Thus the resistance element, a collector ring conductor and terminal connections therefor are mounted in or on the base or body part of the housing, and the remainder of the operating parts are mounted in the cover part. The two parts of the housing are provided with interfitting portions including mating outer wall portions through one of which a driving-head or end portion of the driving gear is accessible from outside the housing. The two housing parts, with respective components assembled therein, are arranged and adapted to be secured together by adhesive. The adhesive, together with sealing means provided for the driving end of the worm gear, permit the interior of the housing to be sealed against ingress of foreign matter. Preferably the housing parts are of square plan form; however, as will be evident, other housing configurations may be used.

The preceding brief general description of the invention makes it evident that one principal object of the invention is to provide improvements in gear adjusted variable resistors or potentiometers.

Another principal object of the invention is to provide simpler and more effective actuating means for gear adjusted variable resistors.

Another principal object of the invention is to provide means in a gear adjusted variable resistor, for producing a sense-perceptible signal indicative of stoppage of the movable contact during continued rotation of the driving gear.

Another important object of the invention is to provide in a worm gear adjusted potentiometer a means for preventing mutual contact between the driving worm gear and the movable contact of a gear adjusted variable resistor.

Other objects and advantages of the present invention are hereinafter set out in the appended claims or stated in the following description of a preferred exemplary variable resistor or potentiometer incorporating or embodying the principles of the invention. The description has reference to figures of the accompanying drawings in which the exemplary variable resistor is illustrated and in which drawings:

FIGURE 1 is a pictorial view of the mentioned variable resistor, which is connected as a potentiometer, with parts broken away to illustrate a detail of construction;

FIGURE 2 is a bottom view of a first part of a potentiometer housing depicted in FIGURE 1, with components supported therein, but with portions of parts broken away to expose details of construction;

FIGURE 3 is a sectional view taken as indicated by broken line 3—3 in FIGURE 2;

FIGURE 4 is a top view of the second portion or member of the potentiometer housing depicted in FIGURE 1;

FIGURE 5 is a top view of the second portion of the potentiometer housing, with a resistance element, a return-conductor ring and terminal connections fixed therein;

FIGURE 6 is a transverse sectional view of the exemplary potentiometer taken as indicated by broken line 6—6 in FIGURE 1;

Figure 7:
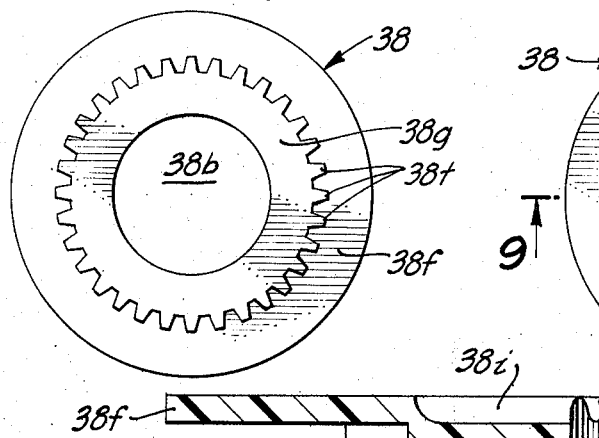
FIGURE 7 is a top view and FIGURE 8 is a bottom view, of a worm wheel device depicted in part in others of the drawings.

Herein, for convenience, the first portion of the housing will be called the cover, and the second portion will be called the base, but it will be understood that the relative positions of the two portions may be reversed. Similarly, the worm wheel device will be termed a driven gear device.

With reference first to FIGURE 1 of the drawings, it may be noted that the exemplary potentiometer, 20, is of flat, square, box-like configuration, and that it is constructed and arranged with a centrally-located aperture 20h therethrough from face to face. The potentiometer housing means consists essentially of a cover 22 and a base 24. The base and cover are preferably formed by molding synthetic resin but may be entirely or in part of metal, suitably insulated. For convenience only, the outer face of cover 22 is termed the top face or top and the outer face of base 24 is termed the bottom face or bottom. The aperture 20h is provided, as noted in the aforementioned copending application, as a means permitting simple attachment or mounting of the potentiometer on a panel or other supporting structure, such mounting arrangement not only simplifying the fastening means required but also permitting use of a very much longer resistance element than could be used in a potentiometer of comparable size if marginal fastening means were employed. Also it is noted that the housing portions are so shaped as to fit neatly together to form a strong rigid box-like structure which provides an enclosed chamber 23 (FIGURE 3), in which chamber certain operating parts of the potentiometer are disposed. Further, the housing means are so formed that there is provided a passage from the exterior of the housing into the enclosed chamber, the passage being for a purpose presently to be explained.

As is indicated in FIGURES 2, 3 and 6, cover 22 is formed as a generally square open-faced box-like member having four outer walls 22a, 22b, 22c and 22d, joined by an interconnecting floor-like web 22e that also connects the outer walls with an upstanding centrally-located substantially cylindrical or tubular inner wall 22f. The wall 22f provides the aforementioned aperture through the potentiometer, as will presently be made evident. As is indicated in FIGURES 3 and 6, wall 22f is higher than are the encircling outer walls. As may also be evident, the interior cross-sectional shape or configuration of the bore or aperture 20h provided by wall 22f may be of other than circular cross-section (hexagonal, for example), but the shape of the outer face of wall 22f facing toward the four outer walls is at least in part of cylindrical shape to provide a simple cylindrical bearing surface upon which rotatable components may rotate, and for other reasons hereinafter made evident.

As indicated in FIGURES 4, 5 and 6, base 24 is similarly of substantially square, open-faced box-like configuration with shallow outer walls, and an upstanding inner wall 24a of greater height than the outer walls and shaped to form a close fit around the inner wall 22f of cover 22. The inner wall 24a is joined to the outer walls of base 24 by a web or floor 24f. The outer walls of the base are formed to be complementary to those of cover 22, and the two sets of walls are formed to fit together snugly along lines of juncture 25 (FIGURES 1 and 6), at which junctures the two components of the housing are united by adhesive. Adhesive is preferably also employed on the mating inner surface of cylindrical wall 24a and upon part of wall 22f, whereby the two housing components are firmly united and sealed together. Further, interengaging means are provided for insuring that the cover may be united with the base in one relative position only, that is, with the respective outer walls mated each with only a particular one of the walls of the cover. To that end base 24 is provided with an upstanding cylindrical projection or key 24k (FIGURES 4 and 5), formed and positioned to be received in a complementary keyway 22k (FIGURE 2) formed in one corner portion of cover 22. The purpose of such keying is to assure proper positioning of a stop abutment relative to ends of a resistance element, as will presently be made evident.

Sealed in the floor 24f of base 24 are three terminals 26, 26' and 27 (FIGURE 1). The terminals may be in the form of stiff wires or pins, and they may be secured with their inner ends exposed in the chamber 23, either by adhesive sealant means or by being integrated into the base at the time the latter is formed by molding. The general disposition of the inner end portions of the terminals is illustrated in FIGURE 6, and areal disposition on the floor of the base 24 as illustrated in FIGURES 4 and 5.

Figure 11:
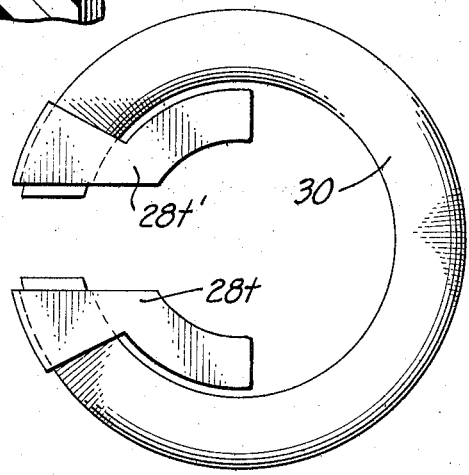
FIGURE 11 is a bottom view of the resistance element depicted in FIGURE 5, illustrating the attachment of terminal tabs.

Seated on an insulative spacing ring 28 (FIGURE 6) and adhesively secured to the floor of base 24 is a resistance element 30. The resistance element is of arcuate configuration, and in the illustrated exemplary construction comprises an insulated metallic core carrying a winding of fine-gauge resistance wire, as is indicated in FIGURES 6 and 11. The generally arcuate shape of the resistance element is illustrated in FIGURE 11; and therein are illustrated conductive terminal strips 28t, 28t' that are welded or otherwise conductively secured to electrical ends of the resistance element. As indicated in FIGURE 5, the resistance element 28 substantially encircles the upstanding cylindrical inner wall portion 24a of the base, and the terminal strips are so shaped that the inwardly extending arcuate horns thereof overlie respective ones of the inner ends of terminals 26 and 26' to a respective one of which each strip is conductively secured as by brazing. Thus terminal connections to the electrical ends of the resistance element are provided.

Figure 10:
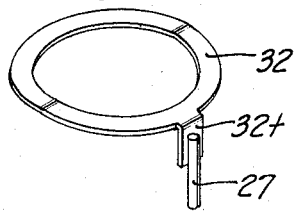
FIGURE 10 is a pictorial view of the electric return terminal ring, and a terminal member.

Terminal 27 is brazed or welded at its inner end to the downturned tab portion 32t of a resilient deformed ring 32 (FIGURE 10) that serves as a collector or return conductor for the movable contact of the potentiometer and thus forms a part of a terminal connection for the movable contact. As is indicated in FIGURE 10, ring 32 is deformed by slight bends or crimps, preferably at diametrically opposite regions spaced equally from tab 32t and so as to be deformed out of planar configuration, whereby the ring may act as a spring or wave washer. As is indicated in FIGURE 5, ring 32 is dimensioned and disposed to overlie the upper flat end of the inner cylindrical wall 24a of base 24. The ring has an inside diameter slightly larger than that of the wall; and it is held in position above the end of the wall by the attachment of tab 32t to the fixed upper end of terminal 27.

The preceding description of base 24 and the components secured thereto has made it evident that a subassembly of parts has been produced that is easily susceptible of being handled without injury and of such character as to facilitate visual inspection and electrical testing of the resistance element and the terminal connections.

Referring now to FIGURES 1, 2 and 3, there is provided in cover 22 a laterally outwardly extending passage 22p (FIGURE 3) in the form of a bore through a corner portion of sidewall 22d, which passage communicates with the interior chamber formed by the housing. Journaled in passage 22p is a driving gear in the form of a worm gear 34 having an inner shaft extension 34a arranged to repose in a slot-like recess formed in a raised portion of web 22e of the cover adjacent the juncture of walls 22a and 22b, the worm gear also having a head 34h adapted for having driving torque applied thereto as by a screwdriver. The head 34h is formed integral with the remainder of the gear 34, and is connected to the thread portion by a stepped shaft portion having known structural characteristics including a circumferential groove whereby the gear may be retained in place in the housing by a retainer pin 35 of known type and the passage sealed against passage of foreign material by a conventional O-ring seal 36.

Figure 8:
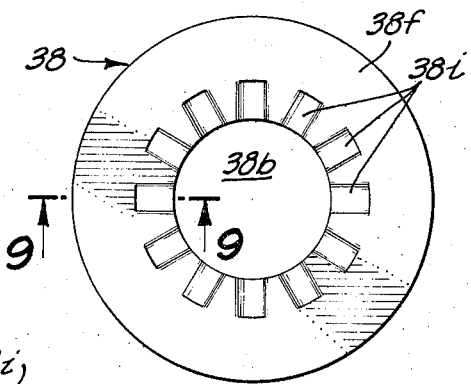
Figure 9:
FIGURE 9 is a sectional view of a fragment of the worm wheel device, taken as indicated by line 9—9 of FIGURE 8.

Rotatably mounted on the cylindrical bearing portion of the inner cylindrical wall 22f of cover 22 is a driven gear device 38 (FIGURES 3 and 4). As shown in the bottom and top views of the exemplary gear device in FIGURES 7 and 8, the device comprises a worm wheel portion 38g having a series of worm wheel teeth 38t dimensioned for meshing with the thread of worm gear 34, and an outwardly extending annular shield or flange portion 38f of radius sufficient to substantially overlie or cover the thread portion of the driving gear when the two gears are meshed. Additionally, gear device 38 is provided with a circular array of surface irregularities 38i each preferably substantially identical to the others. The irregularities may be of several forms as will presently be made evident, but preferably and as shown are uniformly distributed around the axis of rotation of the device and are arranged in an annular area immediately adjacent the axial bore 38b of the gear device and inwardly of the annular flange 38f. An exemplary and preferred form of the surface irregularities is illustrated in FIGURES 8 and 9, in which the irregularities are in the form of radially-extending round-bottom groove-like depressions formed in the end face of the gear device. The bore 38b of the gear device is formed and dimensioned to provide a smooth surface for load-bearing contact with the similarly smooth cylindrical bearing portion of the inner wall 22f. Thus when placed on the latter and seated against the inner face of web 22e of cover 22, as illustrated in FIGURE 6, teeth of the gear portion 38g are in mesh with the thread of driving gear 34; and rotation of the latter will cause rotation of the driven gear device 38. Preferably gear device 38 is formed of electrically insulative synthetic resin or other insulative material and preferably one characterized by being self-lubricating. The flange 38f is purposefully made of insulative material, and as indicated in FIGURES 2, 3 and 6, serves as an electrically insulative shield between driving gear 34 and a conductive rotary contact device presently to be described.

Figure 12:
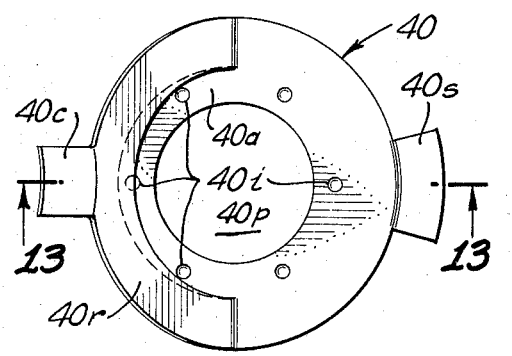
FIGURES 12 and 13 are a bottom face view, and a sectional view, respectively, of a rotary contact device depicted in part in FIGURE 2 of the drawings.

Also mounted for rotation upon the shaft or axis provided by the cylindrical bearing surface of inner wall 22f of cover 22, is a rotary contact device 40 (FIGURES 2, 3 and 12). The exemplary contact device is preferably formed from flat sheet stock of resilient conductive material, by lancing and punching operations of known nature. As is made evident in FIGURES 12 and 13, the contact device comprises a central generally annular substantially planar portion 40a encircling a circular aperture 40p that is dimensioned for a bearing fit on the cylindrical bearing portion of inner wall 22f of cover 22. The annular portion 40a is provided with a circular array of surface irregularities 40i that are preferably uniformly dispersed or spaced and are dimensioned and placed to be complementary to respective ones of the surface irregularities 38i provided on the driven gear device 38. In the preferred arrangement, irregularities 40i are formed as substantially hemispherical tits projects outwardly from one face of the annular portion 40a, as indicated; however, if the irregularities on the surface of gear device 38 are raised projections or tits, those on contact device 40, should be holes or depressions equal to or greater in number than the projections and complementary to the latter, as is deemed to be evident. In either case the number of tits or projections should be evenly divisible into the number of holes or depressions provided in the other rotary member, whereby a clutch-like interengagement all around the array may be effected. As shown in the preferred arrangement there are six deformations 40i (projections or tits) formed around annular portion 40a of the contact device, the deformations being of the shape indicated in FIGURE 13.

Figure 13:

The contact device 40 further comprises a conductive contact means in the form of a deformed outer rim portion 40r (FIGURES 12 and 13) that is preferably integral with the remainder of the device, as shown; and a stop device or means 40s formed as a bent, outwardly extending integral ear. The contact means 40r is provided with a curved outwardly-extending contact 40c dimensioned and positioned to traverse an arcuate path along an arcuate exposed portion of the resistance element. To assure resilient brushing action of contact 40c on the resistance element, the contact means comprising the substantially half-annular rim portion 40r is lanced away from annular portion 40a, and bent out of the plane of the latter as indicated in FIGURE 13. The contact device is assembled on the bearing portion of inner wall 22f of cover 22 as indicated in FIGURES 2, 3 and 6, with the contact 40c extending away from gear device 38 and with the surface irregularities (tits) 40i engaged in complementary depressions or slots 38i on the flange end of driven gear device 38. Thus a second subassembly of components is easily assembled as shown in FIGURES 2 and 3; and that subassembly may have applied thereto along juncture lines 25 and around the outer end part of wall 22f a thin line of self-curing adhesive such as an epoxy resin. Thereafter the subassembly comprising base 24 may be brought into position with wall 22f of the cover entering the interior of wall 24a, and with key 24k opposite slot 22k, and the two subassemblies brought fully together and clamped until the adhesive is fully set. As is indicated in FIGURE 6, wall 24a of base 24 is formed to provide a close fit around inner wall 22f of cover 22.

As is evident, during the bringing together of the cover and the base, wall 22f will first be entered into wall 24a, and as the outer walls approach union contact 40c will be brought into engagement with the arcuate exposed contact zone or surface of resistance element 30, and resilient portion 40r of the contact means will be stressed to maintain the engagement. Further, the outward face of annular portion 40a of the contact device will come into contact with conductive ring 32 at the bends of the latter, stressing the resilient ring and effecting a good conductive path from the contact to terminal 27. With the two portions of the housing thus sealed together, chamber 23 become sealed against ingress of foreign material; gear device 38 is held in position in mesh with the driving gear by the action of the contact device and ring 32, and stop device 40s on the contact device is restricted to an arcuate path limited or terminated by a stationary stop abutment or projection 22s (FIGURE 2) preferably formed as an inwardly extending integral portion of wall 22d of the cover 22. The stop abutment is so dimensioned and disposed as to be engaged by stop device 40s as the contact device is rotated in either direction, and the dimensions and dispositions of the stop device, stop abutment, and resistance element are such that as contact 40c reaches either electrical end of the resistance element the stop device will come into engagement with the stop abutment and be arrested from continued rotation. Thus the rotary motion of the contact is restricted to an arcuate path of less than one revolution and whose ends are defined by the stationary stop means exemplified by stop abutment 22s.

It is evident that continued rotation of worm gear head 34h in either direction by application thereto of appropriate driving torque will normally cause rotation of the worm wheel device 38, and that rotation of the worm wheel device will cause rotation of the contact device in unison therewith (due to interengagement of the circular arrays of surface clutch elements or surface irregularities [40a and 38i]), until stop device 40s engages stop abutment 22s. Further continued rotation of the contact 40c would be useless or harmful and is prohibited, and further continued application of driving torque thereafter causes rotation of driven gear device 38 relative to contact device 40. As a consequence of the relative rotation noted, the tits forming irregularities 40i ride or are forced out of depressions 38i and then snap back into respectively different ones of the irregularities 38i. The relative rotation or slipping continues until rotation of driving gear 34 stops, and during such slipping the countertorque exerted by gear device 38 alternately sharply increases and sharply decreases, providing a countertorque signal that is easily felt or sensed by the person applying torque to the driving gear. Further, during the noted action, an audible signal is produced each time the tits snap into the depressions. Both of such signals are perceptible to the person operating the potentiometer, and thus a warning is given that the motion of the contact has been interrupted as it has reached an end of the resistance element, and that continued application of driving torque to the head of gear 34 is futile. Since during the action noted, irrespective of the direction of rotation, the contact is not driven beyond either end of the resistance element and continued application of driving effort causes slippage of the driven gear device relative to the rotary contact device, no damage to any of the components of the potentiometer results from such excessive rotation or "over-driving" of the driving gear.

It will be noted that since the contact device can be arrested during rotation in either direction, the complementary surface irregularities 40*i* and 38*i* should be formed so that the former are forced out of the latter as easily in one direction of relative rotation as in the other. Thus the formation of elements 38*i* as shallow round-bottom groove-like recesses, and of elements 40*i* as round substantially hemispherical protuberances has been found to provide eminently good results. The interengagement of the surface irregularities provides a substantially positive transmission of driving torque from gear device 38 to contact device 40 during normal (un-arrested) rotation of the rotary components, while providing improved results during the slipping or relative rotation when the contact device is arrested. Such is in distinct contrast to the lack of positive driving or transmission of torque when plain-faced "friction clutch" surfaces are provided between the driving and driven components. In the latter case or construction, any abnormal increase in friction between the rotary contact means and its support may result in slipping of the driving element prior to the contact reaching an end of the element, without any indication as to the actual position of the contact. In contrast, by means of the present invention, a quite positive transmission of driving torque is effected by the interengaged circular arrays of uniformly-spaced discrete irregularities until rotation of the contact device is positively arrested, at which time positive sense-perceptible signals are produced which furnish an unmistakable indication of the status of the potentiometer. The circularly-arrayed uniformly-spaced discrete surface irregularities are very easily and inexpensively produced without adding any parts to the potentiometer. As is evident, the irregularities 38*i* may be formed during the molding of the gear device, and similarly, irregularities 40*i* may be formed concurrently with the punch-forming of the contact device.

As is thought to be evident, the annular flange 38*f* of gear device 38 extends outwardly and is interposed as an insulative shield between the thread of the worm gear and the contact device, thus positively precluding any accidental electric contact between those two conductive components. The flange further adds strength to the driven gear, as is deemed to be evident.

The preceding detailed description of a preferred exemplary form of physical embodiment of the invention illustrates the principles of the invention. It is evident that in the light of that disclosure, variations of form and shape within the spirit and scope of the invention will occur to others. It accordingly is not desired to limit the invention to the specific details of the illustrated devices except as restricted by the appended claims.

I claim:

1. A worm gear adjusted variable resistor comprising:

first means, including housing means of flat box-like external configuration and having a centrally-located mounting aperture therethrough from one face to the opposite face, said housing means providing an enclosed chamber defined in part by a generally cylindrical interior wall bounding the periphery of said aperture, and said housing means being formed to provide a bore-like passage generally transverse to and laterally spaced from said aperture, and said passage extending into said chamber from the exterior of said housing;

second means, comprising a worm gear journaled in said passage and a worm wheel meshed with said worm gear and journaled on said cylindrical wall to rotate therearound, said worm wheel having an annular surface providing engageable and disengageable slip-clutch driving elements and said worm wheel having an annular outwardly-extending flange extending over the region of interengagement of said worm and worm wheel;

third means, including a resistance element in said chamber having an exposed arcuate contact surface substantially encircling said wall, and terminal connections for said element; and fourth means, including an integral resilient metallic rotary contact device journaled for rotation about said cylindrical wall in said chamber, said rotary device comprising a first portion having an annular series of engageable elements disposed in engagement with said engageable and disengageable slip-clutch elements of said worm wheel for rotation by the worm wheel, said rotary contact device further comprising a second portion displaced from said first portion and having an electrical contact rotatable in contact with said contact surface in an arc next adjacent to said flange of said worm wheel and prevented by the said flange from contact with said worm gear, said fourth means including resilient means pressing said contact into engagement with said resistance element and said elements of said portion of said rotary device into engagement with said elements of said worm wheel, and said fourth means including terminal connections for said contact;

whereby said contact is rotatable along said resistance element and adjacent to said region and is prevented from electrical contact with said worm gear by said flange and whereby torque applied to said worm gear is transmitted to said rotary device and said contact.

2. A variable resistor according to claim 1, said elements of said worm wheel and said elements of said rotary device including complementary sets of interengaging elements selected from the class of elements composed of interengageable protuberances and surface depressions, whereby upon relative rotation between said worm wheel and said rotary device incident to arrestment of rotation of the latter there is caused alternate disengagement and re-engagement of such elements to produce a signal indicating such relative rotation.

3. A variable resistor according to claim 2, said housing means comprising a stop abutment in said chamber and said rotary device comprising a stop device arranged to be rotated thereby into engagement with said stop abutment to thereby restrict movements of said contact to a predetermined zone along said resistance element.

4. A variable resistor according to claim 3, in which said housing is composed essentially of a base portion and a complementary cover portion, said base portion being of open-top box-like configuration with an open-ended cylindrical portion upstanding from the center of the floor thereof, said base portion comprising means forming said passage and providing a bearing for said worm gear in said chamber; and in which said cover portion comprises a recess, and means securing said resistance element in said recess.

5. A worm gear adjusted variable resistor comprising:

first means, including housing means of flat box-like external configuration and providing a generally enclosed internal chamber with a passage thereinto from the exterior of the housing, said housing means providing centrally-disposed bearing means;

second means, including a worm wheel rotatable on said bearing means in said chamber and having a driving frictional surface, said second means including a worm gear disposed at least in part in said passage and rotatable therein, said worm gear having a thread meshing with said worm wheel for rotation of the latter incident to worm gear rotation;

third means, comprising an arcuate resistance element disposed in said chamber and substantially coaxially with said bearing means, said third means comprising terminal connections to electrical ends of said resistance element, said terminal connections extending to the exterior of said housing means; and fourth means, including an integral conductive metal contact device rotatably disposed in said chamber for rotation about the axis of said bearing means, said contact device having one portion providing a conductive contact and another portion underlying said one portion and providing resilient means pressing the contact against said resistance element, and terminal connection means for said conductive contact, and said rotary device including a portion having a driven frictional surface disposed in frictional engagement with the said driving frictional surface of said worm wheel to be frictionally driven by said worm wheel, said driving and driven frictional surfaces including complementary circularly arrayed sets of surface depressions and surface protuberances uniformly spaced and normally mutually interengaged for transmission of applied torque and effective to alternately disengage and re-engage incident to arrestment of rotation of said rotary device during continued rotation of said worm wheel, whereby a sense-perceptible signal is productive indicative of any relative rotation between said worm wheel and said rotary device.

6. A worm gear adjusted variable resistor according to claim 5, said worm wheel comprising an annular radially-extending flange of electrically insulative material, said flange being disposed in part between said contact and said worm gear whereby to prevent movement of the contact into engagement with said worm gear.

7. A variable resistor comprising:

first means, including a substantially flat box-like housing, said first means comprising a stationary tubular central portion extending from the upper face of the lower face of said box-like housing and said central portion presenting a cylindrical bearing surface and said housing providing a chamber encircling said central portion, and said housing providing a passage extending from the exterior of the housing into said chamber;

second means, including driving gear means journaled in said passage and having a portion exposed in said chamber and a portion accessible from the exterior of the housing for application of driving torque;

third means, including a driven gear device journaled on said cylindrical bearing surface in said chamber and in mesh with said driving gear to be driven by the latter, said driven gear having a clutch surface and a radially outwardly extending insulative flange overlying the portion of said driving gear adjacent to said driven gear to provide a shield;

fourth means, including an integral resilient metallic rotary contact device, said rotary contact device being journaled for rotation about said central portion in said chamber and having one portion presenting a clutch surface complementary to and engaging said clutch surface on said driven gear so as to be yieldably driven by the latter, said contact device having a second portion presenting a conductive contact rotatable in an arcuate path and prevented from contact with said driving gear by said shield provided by said insulative flange and having a spring portion interconnecting said one portion and said second portion; and fifth means, including a resistance element having an arcuate contact surface exposed along said path for brushing engagement by said contact, and terminal connection means for said contact and said resistance element, said terminal connection means extending to the exterior of said housing.

8. A variable resistor according to claim 7, said driven gear device comprising means forming a first series of surface irregularities disposed in a circular array around said central portion, and said rotary means comprising means forming a second series of surface irregularities disposed in a circular array around said central portion and formed complementary to and disposed to engage respective ones of the surface irregularities of said driven gear device for rotation of said rotary means and said contact device by said driven gear device; said fourth and fifth means including resilient means for yieldingly urging said first and second series of surface irregularities into engagement, whereby said contact device is normally rotatable by rotation of said driving gear and whereby incident to arrestment of rotation of said contact device during continued rotation of said driven gear device said resilient means yields and a sense-perceptible signal indicative of such arrestment is produced.

9. A worm gear adjusted variable resistor comprising:

first means, including housing means of flat box-like external configuration and providing a generally enclosed internal chamber with a passage thereinto from the exterior of the housing, said housing means providing centrally-disposed bearing means and a stop abutment;

second means, including a worm wheel rotatable on said bearing means in said chamber and having a driving frictional surface, said second means including a worm gear disposed at least in part in said passage and rotatable therein, said worm gear having a thread meshing with said worm wheel for rotation of the latter incident to worm gear rotation;

third means, comprising an arcuate resistance element disposed in said chamber and substantially coaxially with said bearing means, said third means comprising terminal connections to electrical ends of said resistance element, said terminal connections extending to the exterior of said housing means; and fourth means, including an integral conductive metallic contact device rotatably disposed in said chamber for rotation about the axis of said bearing means, said contact device having a first portion presenting a contact and a second portion facing said first portion and having means pressing the contact against said resistance element, and terminal connection means for said conductive contact, and said contact device including in said second portion a portion having a driven frictional surface disposed in frictional engagement with the said driving frictional surface of said worm wheel to be frictionally driven by said worm wheel, one of said driving and driven frictional surfaces including a circularly arrayed set of surface depressions and the other of said driving and driven frictional surfaces having at least one tit arranged for cooperative engagement with any one of said surface depressions for transmission of applied torque and said tit being effective to disengage from one of said surface depressions and engage in another of said surface depressions incident to arrestment of rotation of said rotary device during continued rotation of said worm wheel, said rotary device having a stop device movable in an arcuate path the ends of which are defined by said stop abutment, whereby continued rotation of said worm wheel causes rotation of said stop device into engagement with said stop abutment and thereafter further continued rotation of said worm wheel in the same direction causes said tit to disengage from a surface depression and rotation into another depression to thus avoid damage to said variable resistor incident to excessive rotation of said worm gear.

10. A variable resistor comprising:

first means, including a substantially flat box-like housing, said first means comprising a stationary tubular central portion extending from the upper face to the lower face of said box-like housing and said central portion presenting a cylindrical bearing surface and said housing providing a chamber encircling said central portion, and said housing providing a passage extending from the exterior of the housing into said chamber;

second means, including driving gear means journaled in said passage and having a portion exposed in said chamber and a portion accessible from the exterior of the housing for application of driving torque;

third means, including a driven gear device journaled on said cylindrical bearing surface in said chamber and in mesh with said driving gear means to be driven by the latter, said driven gear device having an array of surface irregularities uniformly spaced along a circle around and spaced from said bearing surface, said irregularities being of substantially identical configuration;

fourth means, including rotary means comprising an integral metallic contact device, journaled for rotation about said central portion in said chamber and having a first portion presenting an array of surface irregularities uniformly spaced along a circle around and spaced from said bearing surface and formed and disposed to be complementary with and engage respective ones of said surface irregularities of said driven gear device whereby to transmit torque to said contact device, said contact device comprising a second portion facing said first portion and presenting an electrical contact rotatable in an arcuate path encircling said central portion of said housing; and fifth means, including a resistance element having an arcuate contact surface exposed along said arcuate path and disposed to be brushed by said electrical contact, said fifth means comprising terminal connections for said resistance element connected thereto and extending to the exterior of said housing;

said fourth and fifth means comprising resilient means effective to yieldingly urge surface irregularities of said rotary means and of said driven gear device into mutual interengagement and said electrical contact against said element and said fourth and fifth means being effective to provide an electrical terminal connection to said electrical contact, whereby incident to arrestment of rotation of said rotary contact device during continued rotation of said driven gear device surface irregularities of said arrays of surface irregularities alternately engage and disengage and produce a sense-perceptible indication of such arrestment and whereby no damage to said several means occurs incident to such continued rotation of said driven gear device.

11. A variable resistor according to claim 10, said driven gear device comprising an electrically insulative radially extending annular flange disposed between said arcuate path and said driving gear means and effective to prevent engagement of said contact with said driving gear means.

12. A variable resistor according to claim 11, said first means comprising a stationary stop abutment, and said fourth means comprising a rotary stop device rotatable therewith in a generally circular path interrupted by said stop abutment, said stop abutment and said stop device being effective to restrict rotation of said rotary contact device to less than one complete revolution whereby said electrical contact may not be driven beyond either end of said arcuate resistance element.

13. A gear adjusted variable resistor comprising:

housing means providing an enclosed chamber and a passage leading to the chamber from the exterior of the housing means, and stop means stationary with respect to the housing means, in said chamber;

a driving gear journaled in said passage and a driven gear device journaled in said chamber and disposed in mesh with said driving gear to be rotated by the latter;

a resistance element having an arcuate contact surface exposed in said chamber with said surface substantially coaxial with said driven gear, and terminal means for said element;

rotary means including an integral folded metallic contact device having a first portion presenting a rotary contact disposed to brush on said exposed contact surface of said resistance element and having a second portion presenting a stop device rotatable in an arcuate path terminated at both ends by said stop means in said chamber and said first and second portions comprising a resilient interconnection permitting said second portion to yield relative to said contact, said stop means being effective to arrest rotation of said rotary contact when said stop means is engaged by said stop device to thereby prevent movement of said contact past either end of said resistance element, and terminal means for said contact;

means, comprising first and second normally engaged circular arrays of uniformly-spaced discrete complementary surface irregularities arranged respectively on said driven gear device and on said rotary means, irregularities of one of said arrays thereof being complementary to irregularities of the other of said arrays thereof and capable of transmitting driving torque from said driven gear device to said rotary means to rotate the latter, and capable of automatically disengaging from said irregularities of the other of said arrays thereof upon arrestment of said rotary means, whereby continued rotation of said driving gear following engagement of said stop device with said stop means causes intermittent disengagement and reengagement of irregularities of said first and second arrays thereof, to obviate damage to any of said means and to produce a sense-perceptible signal indicative of arrestment of rotation of said rotary means.

14. A gear adjusted variable resistor as defined by claim 13, said first array of surface irregularities consisting of an array of groove-like depressions in a face of said driven gear device, and said second array of surface irregularities consisting of an array of protuberances of substantially hemispherical configuration each complementary to any of the said groove-like depressions.

References Cited by the Examiner

UNITED STATES PATENTS

| | | | |
|---|---|---|---|
| 2,880,293 | 3/1959 | Blanco | 338—202 X |
| 3,099,810 | 7/1963 | Habereder | 338—174 X |
| 3,105,217 | 9/1963 | Ferrell et al. | 338—148 |
| 3,105,949 | 10/1963 | Zarrillo | 338—174 |

ANTHONY BARTIS, *Acting Primary Examiner.*

RICHARD M. WOOD, *Examiner.*

R. F. STAUBLY, *Assistant Examiner.*